United States Patent [19]

Sugier et al.

[11] 4,148,760

[45] Apr. 10, 1979

[54] CATALYST FOR OXIDIZING SULFUR OR SULFUR COMPOUNDS

[75] Inventors: André Sugier, Rueil Malmaison; Philippe Courty, Houilles; André Deschamps, Noisy le Roi; Henri Gruhier, Chatillon sous Bagneux, all of France

[73] Assignee: Institut Francais du Petrole, Paris, France

[21] Appl. No.: 858,125

[22] Filed: Dec. 6, 1977

[30] Foreign Application Priority Data

Dec. 6, 1976 [FR] France .............................. 76 37566

[51] Int. Cl.$^2$ .......................... B01J 21/12; B01J 23/84
[52] U.S. Cl. ................................................. 252/455 R
[58] Field of Search ........................... 252/455 R, 464; 423/244, 535, 573 G, 576

[56] References Cited

U.S. PATENT DOCUMENTS

| 2,083,894 | 6/1937 | Connolly | 423/244 |
| 3,454,356 | 7/1969 | Raman | 423/244 |

*Primary Examiner*—W. J. Shine
*Attorney, Agent, or Firm*—Millen & White

[57] ABSTRACT

Sulfur and oxidizable sulfur compound are oxidized in gas phase in the presence of a catalyst comprising vanadium oxide, iron oxide and aluminous cement. Silver and titanium oxide may also be present.

12 Claims, No Drawings

CATALYST FOR OXIDIZING SULFUR OR SULFUR COMPOUNDS

The invention concerns a process for the catalytic oxidation of sulfur or sulfur compound pollutants contained in a gas.

Certain industrial gases, for example the effluents from Claus units, comprise, in addition to unconverted hydrogen sulfide, non-negligible amounts of carbon oxysulfide, carbon disulfide and sulfur. An effluent containing such diverse sulfur compounds must be treated, so as to contain only one type of compound, in that case sulfur dioxide.

Certain effluents from the chemical industry contain hydrogen sulfide, sulfides or light mercaptans which are toxic and malodorous. The purification will comprise the conversion of these compounds to sulfur and sulfur dioxide, depending on the amount of oxygen, this amount being well-known to skilled people. The present process can thus be used in conjunction with the conventional Claus process.

Other industrial gases contain as the essential pollutants, besides sulfur compounds, hydrocarbons, formaldehyde, alcohols, phenol derivatives, carbon monoxide and, as a rule, organic compounds, which must be converted to non-pollutant compounds such as carbon dioxide and water by complete oxidation.

Pyrolysis of such compounds as above described requires high temperatures for the gas to be treated, on the order of 600 to 850° C.; this process also requires high oxygen amounts for good performance, which in some cases requires a high dilution and substantially increases the amount of gas to be preheated.

A catalytic process, on the other hand, has the essential advantage of allowing the oxidation to be initiated at a lower temperature, as from 150 to 200° C., particularly when the treated gas contains hydrogen sulfide; it also necessitates only low oxygen amounts, for example 1.5 to 5 times the theoretical amount of oxygen necessary to complete oxidation.

It has now been found that catalysts comprising vanadium oxide and iron oxide associated with aluminous cement are very active in this type of oxidation of sulfur or sulfur oxidizable compounds. Sulfur is mainly converted to sulfur dioxide; $H_2S$, COS and $CS_2$ are converted to sulfur and/or sulfur dioxide, depending on the proportion of oxygen.

These catalysts are also useful to eliminate oxygen, when present in low proportion in a gas comprising oxidizable sulfur compounds, as is the case, for example, in the Claus units.

The vanadium oxide content of the catalyst is advantageously from 1 to 20% (preferably 1 to 10%) by weight, the iron oxide proportion being from 1 to 70% (preferably 2 - 30%) b.w. The aluminous cement content is at least 10% b.w., preferably 60 to 95% b.w.

The active elements may be incorporated into the aluminous cement in any usual manner. They are, for example, deposited by one or more impregnations of solutions of soluble salts on a preformed carrier of aluminous cement, for example as balls of 1 - 15 mm diameter, extrudates of 2 - 50 mm length or pellets of 1 - 15 mm diameter. It is also possible to coprecipitate the active elements on powdered and subsequently shaped cement, or to impregnate by means of solutions the powdered and then shaped cement, or to mix oxides or salts with the aluminous cement, and then shape them as extrudates or pills. A preferred aluminous cement contains by weight at least 30% of alumina and at least 10% of calcium oxide or barium oxide. After the components, including water have been admixed, the cement is set, preferably at 30 - 120° C., for 1 - 10 hours; calcination takes then place, preferably at 300 - 600° C., for 1 - 10 hours. After setting and calcining, the calcium aluminate and/or barium aluminate content of the cement present in the catalyst is preferably at least 50% b.w. (dry weight).

Preference is given to a refractory aluminous cement such as, for example, a SECAR cement as produced by LAFARGE Company, which comprises the following elements (in % b.w.):

| TYPE OF BINDER | $Al_2O_3$ | CaO | $Fe_2O_3$ | FeO | $SiO_2$ | MgO | $K_2O$ |
|---|---|---|---|---|---|---|---|
| SECAR 150 | 50 | 27 | 5 | 1 | 5 | 0.2 | 0.05 |
| SECAR 250 | 70 | 26 | 0.1 | 0.2 | 0.2 | 0.2 | 0.05 |
| Super SECAR 250 | 80 | 18 | 0.1 | — | 0.1 | 0.05 | — |

| TYPE OF BINDER | $Na_2O$ | $SO_3$ | S | $P_2O_5$ | $Mn_2O_3$ | $Cr_2O_3$ | $TiO_2$ |
|---|---|---|---|---|---|---|---|
| SECAR 150 | 0.05 | 0.05 | 0.05 | 0.10 | 0.02 | 0.10 | 3 |
| SECAR 250 | 0.5 | 0.03 | 0.01 | 0.05 | 0.005 | 0.002 | 0.003 |
| Super SECAR 250 | 0.8 | 0.05 | 0.01 | 0.05 | 0.005 | 0.003 | 0.003 |

These cements usually comprise (dry weight) 40 - 85% (preferably 50 - 80%) b.w. of $Al_2O_3$ and 15 - 45% (preferably 15 - 30%) b.w. of CaO, with a preferred minimum of 70% b.w. of ($Al_2O_3$ + CaO). The $SiO_2$ content is usually 0 - 15%, preferably 0.1 - 5% b.w.

When other elements are present (oxides of other metals or non-metals), their total content is usually lower than 5% b.w. (dry weight).

The results obtained with cements of other types, for example with Portland cement, are less satisfactory, particularly as concerns the mechanical behavior and the life time of the catalysts.

Setting of cement and mechanical behavior are improved by adding ammonium carbonate when admixing the components.

In certain cases, particularly when treating a gas containing carbon oxysulfide and/or carbon disulfide at a temperature lower than 350° C., it has been found that the activity of the catalysts could be greatly increased by adding either 500 to 20,000 ppm b.w. of silver or 1 to 20% b.w. of titanium oxide or a mixture of both.

Silver and/or titanium oxide may be added in admixture with the other elements, for example by co-impregnation on the preformed cement carrier, by mixing with the other elements or by impregnation of the cement before shaping, or added after the other elements by impregnation.

Iron may be used, for example, as metal, oxide, hydroxide or salt, such as iron nitrate, chloride, sulfate or a carboxylate. Vanadium may be used, for example, as metal, oxide, as vanadic acid, or as salt, for example vanadium sulfate or oxalate, or ammonium metavanadate.

These catalysts may be used at temperatures higher than 150° C., for example at 200 – 700° C and preferably 300 – 600° C. The catalysts are preferably used in such amounts that the VVH be between 1,000 and 30,000 and usefully between 2,000 and 10,000 (VVH = volume of treated gas per volume of catalyst per hour).

According to the invention, the air may be introduced at one point of the plant or preferably at several points, so as to limit any local overheating; this may be obtained, for example, by dividing the catalyst bed into several sections.

When the gas to be treated contains organic sulfur compounds, it may be more advantageous to have this combustion step preceded with a step of hydrolysis with steam. This may be effected, for example, according to a technique described in the French Patent No. 2,123,778. The operation is then conducted in the substantial absence of oxygen, i.e. in a reducing medium (at most the same volume of oxygen as the volume of CO may be tolerated).

This hydrolysis step may also be applied to the catalysts employed in the invention. In that case the injection of air is carried out at an intermediate point of the catalyst bed, the first part of the catalyst bed being then designed for hydrolysis of the organic sulfur compounds.

The following examples are given for illustration purposes and are not to be interpreted as limiting the scope of the invention. The % compositions are given by weight.

CATALYST A 5 kg of vanadium oxide $V_2O_5$, 12.5 kg of iron hydrate of 80% b.w. $Fe_2O_3$ content and 85 kg of SECAR 250 cement are mixed in a crushing mixer; the powder is then shaped to pills in a pill-shaper of 1 meter diameter by pulverising a 50 g/liter solution of ammonium carbonate which improves the setting of the cement.

The resulting pills are heated to 70 – 80° C. for 4 hours to set the cement, then maintained 4 hours in air at 550° C. The resulting catalyst has the following approximate composition: $V_2O_5$ = 5%, $Fe_2O_3$ = 10%, $Al_2O_3$ + CaO = 85%. More than 70% of calcium and aluminum are present as calcium aluminate.

CATALYST B 5 kg of vanadium oxide $V_2O_5$, 12.5 kg of iron hydrate containing 80% b.w. of $Fe_2O_3$, 12.5 kg of titanium gel containing 40% of $TiO_2$ and 80 kg of Super SECAR 250 cement are mixed in a mixer. Pills are made therefrom as described for catalyst A. After setting, the cement is maintained at 550° C. in air for 4 hours. The resulting catalyst has the following approximate composition: $V_2O_5$ = 5%, $Fe_2O_3$ = 10%, $TiO_2$ = 5%, $Al_2O_3$ + CaO = 80%. More than 70% of aluminum and calcium are combined as calcium aluminate.

CATALYST C 5 kg of vanadium oxide $V_2O_5$, 12.5 kg of iron hydrate containing 80% b.w. of $Fe_2O_3$ and 85 kg of SECAR 250 cement are mixed in a mixer. The powder is then shaped to pills while adding a 10 g/liter solution of silver nitrate. The pills are then heated to 70 – 80° C. for setting the cement, and then maintained at 550° C. for 4 hours. The resulting catalyst has the approximate composition $V_2O_5$ = 5%, $Fe_2O_3$ = 10%, Ag = 0.4%, $Al_2O_3$ + CaO = 84.6%. More than 70% of calcium and aluminum is present as calcium aluminate.

EXAMPLE 1

10,000 $Nm^3$/hour of effluent gas from a Claus unit, whose composition by volume is:

| | |
|---|---|
| $SO_2$ | 0.4 % |
| $H_2S$ | 0.8 |
| $CS_2$ | 0.1 |
| COS | 0.4 |
| S (vapor + visicles) | 0.15 |
| $H_2O$ | 29 |
| $CO_2$ | 5 |
| $H_2$ | 1 |
| $N_2$ | 63.15 | are heated by mixing with a combustion gas (as an average the gas is reducing) discharged from an auxiliary burner and introduced with an excess of air into a post combustion chamber (incinerator) whose volume is 3 $m^3$ and wherein a catalyst is present. Taking the air and combustion gas supply into account, the volume of gas discharged from the incinerator is about 13,000 $Nm^3$ per hour.

Depending on the operating conditions of the incinerator (temperature in °C, nature of the catalyst), the following results have been reported for the composition of the effluent at the outlet, the volume of catalyst being 2 $m^3$.

| Operating conditions content of pollutants (2) | CATALYST A | | CATALYST B | | CATALYST C | |
|---|---|---|---|---|---|---|
| | T=300 (1) | T=600 | T=300 | T=600 | T=300 | T=600 |
| $H_2S$ | 30 | < 5 | 10 | < 5 | 10 | < 5 |
| $CS_2$ | 400 | <10 | 80 | <10 | 70 | <10 |
| COS | 460 | <10 | 160 | <10 | 130 | <10 |
| S | 200 | < 5 | 20 | <10 | 20 | <10 |

(1) - Temperature in ° C.
(2) - in ppm by volume.

EXAMPLE 2

Example 1 is repeated, except that the above 10,000 $Nm^3$/h of gas are treated in two serially arranged reactors each containing 2 $m^3$ of the same catalyst.

The first reactor is maintained at 300° C. and is only fed with the effluent gas admixed with the combustion gas; Air is introduced between the first and second reactor in such an amount that the oxygen content at the outlet from the second reactor is 0.5%.

The first reactor is thus used for a preliminary hydrolysis, the second reactor being used as incinerator. It is to be noted that the same technique may be used with only one reactor with air supply at an intermediate point thereof.

The following results have been obtained, as concerns the composition of the effluent at the outlet.

The temperature given in the table is that of the second reactor (incinerator).

| Operating conditions content of pollutants (2) | CATALYST A | | CATALYST B | | CATALYST C | |
|---|---|---|---|---|---|---|
| | T=300 (1) | T=600 | T=300 | T=600 | T=300 | T=600 |
| $H_2S$ | 40 | < 5 | 40 | < 5 | 20 | < 5 |

-continued

| Operating conditions content of pollu- tants (2) | CATALYST A T=300 (1) | T=600 | CATALYST B T=300 | T=600 | CATALYST C T=300 | T=600 |
|---|---|---|---|---|---|---|
| $CS_2$ | 60 | <10 | 20 | <10 | 10 | <10 |
| COS | 110 | <10 | 50 | <10 | 21 | <10 |
| S | 200 | < 5 | 30 | <10 | 15 | <10 |

(1) - Temperature in °C.
(2) - in ppm by volume.

EXAMPLE 3

The experiments had the object of eliminating traces of oxygen present in a $H_2S$ containing gas, as is the case in Claus units.

The experiments have been conducted with a gas discharged from a Claus unit after condensation of sulfur. Its composition in % by volume was as follows:

| $H_2S$ | 4.8% |
|---|---|
| $SO_2$ | 2.4 % |
| $CO_2$ | 4.9 % |
| CO | 0.1 % |
| $N_2$ | 60.7 % |
| $O_2$ | 0.3 % |
| $H_2O$ | 26.2 % |
| $COS + CS_2$ | 0.6 % |

The catalyst is arranged in a reactor and the temperature is 230° C. The volume of gas (NTP) delivered per hour and per volume of catalyst is 5,000 (VVH).

At the outlet from the reactor, the oxygen content (in ppm) is determined:

| CATALYST | $O_2$ AT THE OUTLET |
|---|---|
| A | <30 |
| B | <30 |
| C | <30 |

The limit of sensitivity of the analytical device is 30 ppm of oxygen. The content of COS and $CS_2$ at the outlet is also determined, as well as the amount of sulfur formed, and this is indicated in the following table as % of the combined sulfur of the charge ($H_2S$, $SO_2$, $CS_2$, COS)

$$\% S = \frac{\text{formed S}}{\text{sulfur combined in the charge}}$$

| CATALYST | % COS + $CS_2$ at the outlet | % S |
|---|---|---|
| A | 0.3 | 72 |
| B | 0.3 | 74 |
| C | 0.2 | 74 |

These results show that oxygen has been practically totally eliminated with simultaneous hydrolysis of COS and $CS_2$ and production of sulfur.

EXAMPLE 4

Sulfur has been produced from an acid gas containing $H_2S$, as is the case from effluents from coal or oil bottoms gasifying.

The gas had the following composition by volume:

| $H_2S$ | 1 % |
|---|---|
| $CO_2$ | 9.25 % |
| $H_2O$ | 2.5 % |
| $CH_4$ | 1 % |
| $C_4H_8$ | 0.5 % |
| air | 2.5 % |

The catalyst was placed in a reactor whose inlet temperature was 175° C. The volume of gas (NTP) per hour and per volume of catalyst was 2,000 (VVH).

At the outlet from the reactor, sulfur was analyzed; the yields of sulfur, reported to the $H_2S$ content at the inlet, are given in the following Table:

| CATALYST | YIELD OF SULFUR (%) |
|---|---|
| A | 91 |
| B | 91 |
| C | 91 |

What we claim is:

1. A catalyst comprising 1-70% by weight of iron oxide consisting essentially of $Fe_2O_3$, 1-20% by weight of vanadium oxide consisting essentially of $V_2O_5$ and at least 10% by weight of aluminous cement, the latter comprising at least 50% by weight of calcium aluminate and/or barium aluminate.

2. A catalyst according to claim 1, which comprises 2-30% by weight of said iron oxide, 1-10% by weight of said vanadium oxide and 60-95% by weight of said aluminous cement.

3. A catalyst according to claim 1, in the form of balls of 1 - 15 mm diameter.

4. A catalyst according to claim 1, wherein the aluminous cement portion of the catalyst comprises 40 - 85% by weight of $Al_2O_3$ and 15 - 45% by weight of CaO with at least 70% by weight of ($Al_2O_3$ + CaO).

5. A catalyst according to claim 4, wherein the aluminous cement portion of the catalyst comprises 50 - 80% by weight of $Al_2O_3$, 15 - 30% by weight of CaO, 0.1 - 5% by weight of $SiO_2$ and less than 5% by weight of other elements.

6. A catalyst according to claim 1, wherein silver is also present in an amount of 500 to 20,000 ppm by weight.

7. A catalyst according to claim 1, which also comprises 1 - 20% by weight of titanium dioxide.

8. A catalyst according to claim 6, which also comprises 1 - 20% by weight of titanium dioxide.

9. A catalyst according to claim 4, wherein silver is also present in an amount of 500 to 20,000 ppm by weight.

10. A catalyst according to claim 9, which also comprises 1 - 20% by weight of titanium dioxide.

11. A catalyst according to claim 5, wherein silver is also present in an amount of 500 to 20,000 ppm by weight.

12. A catalyst according to claim 11, which also comprises 1 - 20% by weight of titanium dioxide.

* * * * *